May 1, 1945.  H. S. KNOWLES  2,375,004
TRAINING APPARATUS
Filed May 12, 1943  5 Sheets-Sheet 1

Inventor:
Hugh S. Knowles
By Tesch and Darbo Atty.

Inventor:
Hugh S. Knowles
By Tesch and Darbo
Atty.

May 1, 1945.　　　H. S. KNOWLES　　　2,375,004
TRAINING APPARATUS
Filed May 12, 1943　　　5 Sheets-Sheet 4

Inventor:
Hugh S. Knowles
By Jesch and Darbo
Atty.

May 1, 1945.   H. S. KNOWLES   2,375,004
TRAINING APPARATUS
Filed May 12, 1943   5 Sheets-Sheet 5

Inventor:
Hugh S. Knowles
By Tesch and Darbo
Atty.

Patented May 1, 1945

2,375,004

UNITED STATES PATENT OFFICE 2,375,004

TRAINING APPARATUS

Hugh S. Knowles, River Forest, Ill., assignor to Josephine Knotts Knowles, River Forest, Ill.

Application May 12, 1943, Serial No. 486,712

53 Claims. (Cl. 35—25)

This invention relates to apparatus for training a person in the operation of an automatic gun. More particularly, it relates to methods of and apparatus for producing sound and mechanical effects simulating those encountered in war combat, which methods and apparatus are adapted for use with gunnery training devices to produce an atmosphere of realism.

Gunnery training devices adapted to provide preliminary training in automatic gun operation are known and consist, in general, of a gun which shoots a pellet by means of compressed air, which may be moved as an actual gun to aim at the target, and which carries an actual gun sight. The target usually is a scale model of an expected actual target, or a motion picture image of an actual target and its surrounding environment. In some training devices where a motion picture target is used, the gun does not shoot a pellet and the gun sight is simulated by means of optical effects and means are provided for indicating the accuracy of the aim. The apparatus of the present invention may be used with any of such training devices.

Experience has demonstrated the desirability of simulating actual battle conditions as closely as possible. This permits the segregation of trainees who possess the proper coordination, aptitudes and nervous and emotional stability required for automatic gun operation. The proper use of battle effects in training devices is highly effective for the conditioning of trainees for the unparalleled noise of battle. Such conditioning should take place gradually. The mechanics of gun manipulation and aiming are preferably first learned without the distractions of gun recoil, muzzle blast and general battle sounds. These distracting factors are added successively and increased in intensity until their simulation of actual conditions is as close as is considered advisable for economic, technological or traumatic reasons.

The firing of an actual gun is attended by a number of phenomena which cause degradation of muscular coordination and must be taken into consideration if simulation approaching realism and suitable for conditioning trainees is to be accomplished. (1) There is the recoil of the gun mechanism. (2) There is a sudden flow or blast of air which compresses the thorax and whips the clothing of the trainee. I have found that the air flow past the face and chest and compression of the thorax are far more distracting than the flow around the rest of the body. This phenomenon is called air streaming or air blast. (3) There is an acoustic impulse of extreme intensity which causes pain in the ears of the trainee and is accompanied by a loud cracking noise. The combination of (2) and (3) comprises the initial aerial shock impulse caused by the gun discharge. It exhibits extremely high velocity and intensity, and contains both mechanical and acoustical components. It is immediately followed by (4) a series of impulses of lower intensity which produce a booming noise. (5) There are echoes, which are the acoustic reflections from nearby objects of the cracking and booming noises. The echoes are sufficiently common in actual firing positions that they are considered to be a part of typical gun sounds. They contribute a sense of nearby objects and, therefore, are a distracting factor. The trainee is usually incapable of determining the sequence with which the separate phenomena, except for the echoes, register upon his senses. Most satisfactory results are obtained if they are made to occur as nearly as possible in the order in which the actual phenomena occur.

To facilitate the description, the mechanical component of the initial aerial shock impulse will be called an air blast, or air streaming. These terms contemplate that flow of air which occurs on the detonation of an explosive. Objectively, "air streaming" manifests itself in translational movement of air and causes compression of the thorax and whipping of the clothing. Subjectively, "air streaming" is characterized by the sensation of air flowing past the observer. This "air streaming" or mechanical effect is accompanied by the acoustic crack or initial acoustic impulse.

The acoustic or sound component of the aerial shock impulse will be called an acoustic wave train. This includes the initial acoustic impulse or sharp crack or acoustic blast, the booming noise or impulse wave train, and the echoes or echo wave train. The term "initial shock impulse" will be used to designate the combined effects of air blast or air streaming and the acoustic crack or initial acoustic impulse. The term "shock wave" will be employed to designate all of the mechanical and acoustical effects except for the echoes. That is, the term includes the initial shock impulse and the acoustic booming sound or impulse wave train.

The use of sound effects with training and amusement devices is, of course, not new. Previous apparatus have employed ordinary telephones or head phones, and low or medium powered or horn type speakers mounted at an appreciable distance from the listener, that is, at a distance many times the diameter of the speaker diaphragm. Mechanical noise makers have also been used. All of such known devices have lacked realism and effectiveness for two or more of the following reasons: (1) none of them provided the sudden flow of air, or air streaming, past the listener or any appreciable compression of the thorax; (2) the initial shock impulse simulating gun blast did not have a sufficiently steep wave front or possess sufficient intensity to exceed the pain threshold of many listeners; (3) the impulse wave train or booming noise did not resemble the actual wave train simulated, in intensity, rate of decay or general wave form; and (4) discrete echoes were not provided. The importance of these factors is discussed in further detail hereinafter.

The principal object of the invention is to provide methods and apparatus for creating battle sounds having high distraction value which are synchronized with and complementary to the activities of and the visual action observed by the trainee.

A specific object is to provide apparatus for the artificial generation of shock waves simulating those created by the muzzle blast of the gun being fired, including the sudden flow of air which normally accompanies the actual shock wave.

Another object is the provision of means for generating echoes simulating the echoes which would occur in a typical environment.

Another object is to provide means for actuating the different effect-producing means in timed sequence.

Still another object is the provision of an efficient electroacoustic power conversion system which is capable of handling efficiently the high ratio of peak to average electrical power which is required.

A further object is to provide means for synchronizing intense sounds such as that of an attacking airplane with the motion of model targets.

Other objects and advantages of the invention will become apparent from the disclosure contained in the following description.

Briefly, the invention consists in providing a pneumatic impulse generator which creates the air streaming upon the trainee and the sharp acoustic crack in faithful simulation of the similar phenomena produced by an automatic gun under actual firing conditions. It also provides a loud-speaker and suitable energizing means therefor, which provide acoustic impulses which faithfully simulate the booming noises and the echoes which are normally heard by the trainee in combat. Means are also provided for actuating in timed sequence, the pellet discharging mechanism of the model gun, a recoil mechanism for the model gun, the pneumatic impulse generator and the loud-speaker, whereby the different effects occur in the normal sequence of occurrence of the actual phenomena being simulated.

The invention provides separate means for creating each of the various phenomena. This makes possible independent control of the intensity, quality and time sequence of the aerodynamic and acoustic contributions. It also makes possible the attainment of much higher electroacoustic conversion efficiency. In addition, the apparatus is light in weight and may be operated from a conventional convenience electrical outlet, whereby it is portable and easily installed.

Figure 1:
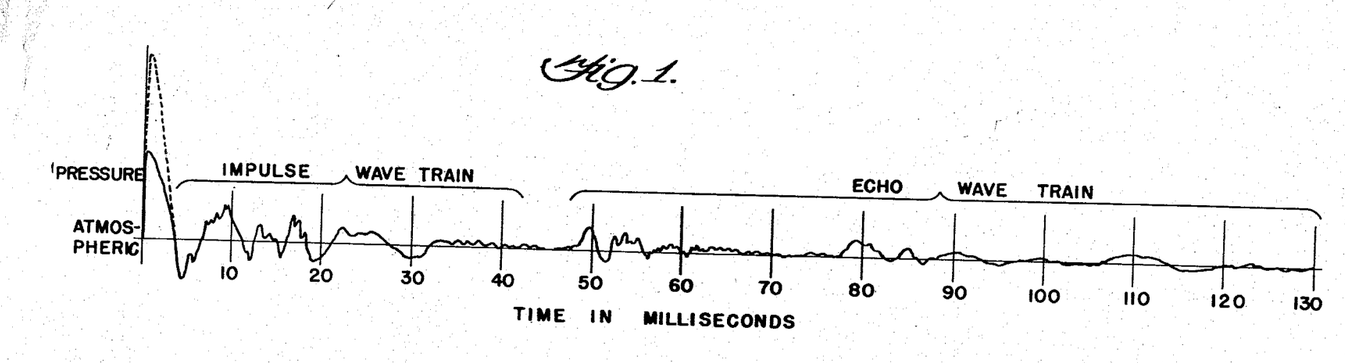
Fig. 1 is a time-pressure curve representing air and acoustic pressure conditions accompanying the firing of an automatic gun.

In the drawings similar reference characters designate corresponding parts throughout. In Figure 1, a time-pressure curve of a gun muzzle blast shock wave is shown. The curve shown in solid lines is representative of the curves for the pressure registered by a piezoelectric pressure gauge ¾ inch in diameter mounted at the gunner's station and in a position normal to the front of the shock wave emanating from the muzzle of an actual small caliber automatic gun. In any specific installation, the curve details depend upon the kind of gun used and acoustical environment which exists within several hundred feet of the gun. However, in substantially all cases the curves possess certain common characteristics, which will be discussed hereinafter, and if such characteristics are reproduced, the sound is readily recognized and satisfactory simulation is obtained.

The shock wave differs in one major respect from a purely acoustic wave. In the shock wave there is sudden compression of the air in the region of occurrence concurrently with rapid flow, or streaming, of the air from the compressed wave front to regions of lower pressure. This is the air streaming or air blast phenomenon mentioned heretofore. The translational movement of the air becomes negligible at a relatively short distance from the source of the shock wave. Part of the energy of the shock wave is converted into a compressional acoustic wave of the conventional type which travels a relatively long distance. The air particle displacement caused by the acoustic wave is very small even in an extremely intense sound field. The time-pressure curve of Figure 1 is a measure of the combined aerodynamic pressure at the gunner's position due to air streaming and the sound pressure as modified by the dynamic response of the pressure gauge. In the case of certain guns and crew positions, pressure impulses measured near the shock wave source in the manner specified heretofore are characterized by a very rapid rise in incremental pressure, to a value of 15 pounds per square inch or more above atmospheric pressure. In typical gun crew positions, the muzzle blast pressure registered by the gauge, rises to a maximum in from 50 to 150 microseconds. Authorities assert that near the source the pressure rise at the shock wave front occurs in from $10^{-10}$ to $10^{-11}$ seconds. The greater time interval measured by the pressure gauge arises from the delayed dynamic response of the gauge. For simulation purposes the peak may be reached in from 100 to 300 microseconds. The simulating wave shape may approximate that of Figure 1 with uniformly reduced amplitude, since the original intensity sounds excessively loud to the trainee and ear trauma is to be avoided, but more satisfactory results are obtained by increasing the relative intensity of the initial shock impulse as shown in dotted lines in Figure 1. The initial shock impulse may thereby be made to exceed the pain threshold of most trainees and yet the balance of the wave train or boom portion may be kept below the pain threshold. From a Fourier integral analysis of an isolated pulse, it can be shown that on a purely acoustic wave basis this abrupt pressure rise can occur only in the presence of very intense sounds in the supersonic and upper audible frequency ranges. It is this sudden intense pressure rise which causes much of the ear pain referred to heretofore. The high frequency components are rapidly attenuated so the pressure rise is more gradual when measured at some distance from the source.

The initial air compression is followed by a rarefaction the character of which depends on the ground or primary reflecting surface. The impulse wave train which trails or follows the initial shock impulse is composed of a train of waves having both mechanical and acoustical components which oscillate about a mean value, with a frequency which is not strictly constant, and gradually decay, as shown in Fig. 1. This wave train is identified by the ear as a single sound.

The echo wave train curves represent acoustic waves reflected from objects which are thirty feet or more from the source and which arrive at the ear a sufficient time after the initial impulse to be identified as discrete echoes. For convenience in plotting, their amplitude has been increased in Fig. 1 by a factor of ten over the amplitude of the impulse wave train. The normal ear is capable of resolving two similar acoustic waves into separate sensations providing their arrival times are spaced by twenty-five milliseconds or more. With an air shock wave of high intensity, such as is represented by the initial acoustic impulse shown in Fig. 1, I have found experimentally that the reflected wave must be spaced from the initial wave an interval of approximately 50 milliseconds or more to produce a separate sensation.

Figure 2:
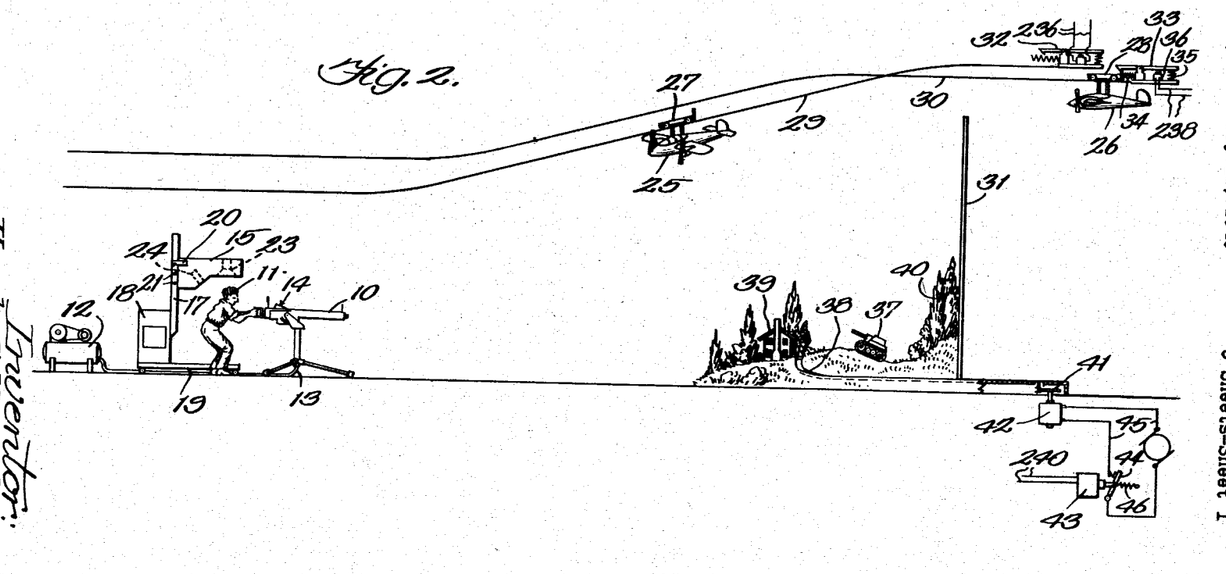
Fig. 2 is an elevational view showing the general features of the training apparatus in a typical training environment.

Fig. 2 illustrates a form of training apparatus in which pellets are fired at model targets. It will be obvious to anyone skilled in the art that the invention may be used with a gun which does not fire a pellet and a target which is a motion picture image projected upon a large screen or into a small box into which the trainee looks. The electropneumatic pellet gun 10 is operated by the trainee 11. Compressed air for firing the pellet is provided by the compressor 12 and is conveyed to the gun 10 by the air conduit 13. An electropneumatic pulse generator 14, which in this embodiment reproduces most of the initial shock impulse, is mounted upon the supporting frame for the gun 10. Pulse generator 14 is illustrated in detail in Fig. 6. The loud-speaker cabinet 15 contains a loud-speaker which reproduces a portion of the initial shock impulse and the impulse wave train, the echo wave trains and the recorded battle sounds. The cabinet 15 is mounted in a vertically adjustable manner upon spaced upright supports 17, which are mounted upon a control cabinet 18 which, in turn, is suported upon a wheeled carriage 19.

Figure 7:
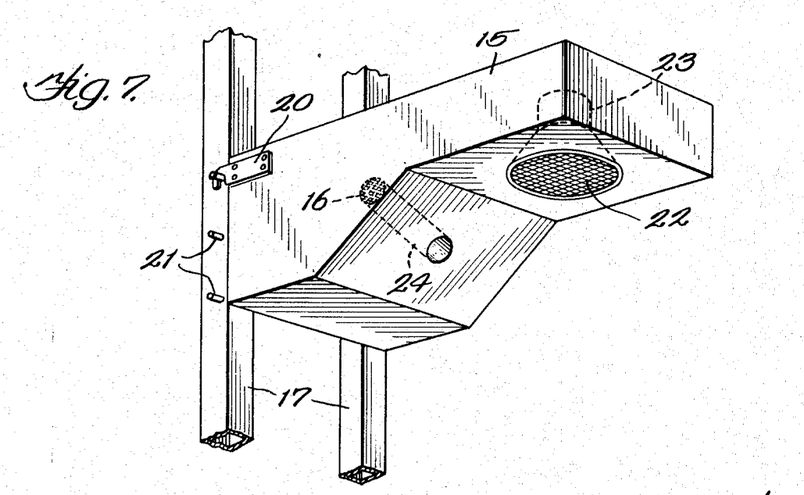
Fig. 7 is a perspective view of one embodiment of a loud-speaker arrangement and a cabinet therefor.

As shown more clearly in Fig. 7, the cabinet 15 has hooks 20 which project rearwardly from the upper portions of the sides thereof and engage pegs 21 which project from the supports 17 at different levels. The lower rearward edge of the cabinet rests against the forward surfaces of the uprights 17 to maintain the cabinet projecting forwardly in a generally horizontal direction. The cabinet 15 contains loud-speaker 23 and vent pipe 24, speaker 23 being located directly above the trainee's head and the diaphragm being arranged to direct the sound toward him.

With this arrangement, the loud-speaker may be kept directly above and close to the trainee when he is firing in either the standing, seated or prone position. The directly overhead position is desirable because the sound is generated in the median plane through the listener's head and is localized with much more difficulty than sound generated at either side and is, therefore, more readily associated as coming from the intended object, as the gun muzzle or a diving model plane. In addition, when a large size cone speaker is selected to augment the streaming effect as will be discussed hereinafter, movement of the trainee in normal gun operation produces a minimum change in the loudness effect of the sound. As the intensity at one ear increases, that at the other ear decreases. Such shift creates little or no impression on the trainee with the overhead arrangement.

The source of battle sounds and of control signals which may be employed, is preferably a phonograph of the conventional flat record, film or magnetic tape type which is housed in control cabinet 18. This cabinet also houses the phonograph amplifier, the sequence timing mechanism, the impulse wave train generator and the echo generator, the control switches for making operative and inoperative the different distractive elements, such as recoil, gun blast and battle sounds, and the controls for adjusting the intensity of such effects. Such apparatus will be described hereinafter.

In Fig. 2 are also shown the airplanes 25 and 26 which are supported by trolleys 27 and 28 upon the overhead tracks 29 and 30, the supports for which are not shown. The airplanes are initially hidden from the view of the trainee by back drop 31. The trolley 28 is held stationary by an electromagnetic release device comprising a pivotally supported arm 33 of electromagnetic material which engages a projection upon trolley 28 and holds said trolley against the compression of a spring 34 as shown in Fig. 2. The arm is held in the trolley engaging position by a compression spring 35. A solenoid 36 is arranged in operative relation with arm 33 and upon the occurrence of an electric impulse in input conductors 236 leading from a control device, which will be described hereinafter, solenoid 36 draws down the adjacent end of arm 33 against the compression of spring 35 whereby the opposite end is raised and trolley 28 is released. Thereupon spring 34 gives the trolley 28 and airplane 26 an impetus toward the trainee. When the airplane 26 is returned by being pulled back to the release mechanism, it is pushed against the spring 34 until the arm 33 is again engaged by the trolley 28. A similar release 32 is provided in operative association with trolley 27 of airplane 25.

A model tank 37 is shown on track 38, emerging into the trainee's view from behind model house 39. The topographical scenery 40 provides a proper combination of moving and fixed targets. The tank 37 is propelled by a continuous chain (not shown) which follows the track 38 and is driven by suitable gearing 41, which is driven by an electric motor 42. The operation of motor 42 is controlled by an electromagnetic relay 43 which operates switch 44 in the energy supply circuit 45 for the motor. The arrangement is such that, upon being energized, relay 43 closes the switch 44 against the tension of spring 46, and the tank 37 thereupon moves. The arrangement is such that the tank stops behind screening scenery for predetermined periods of time. The movement of the tank and the release of the airplanes is synchronized with appropriate battle sounds, and the mechanism for actuating such operations will be described hereinafter.

*Pellet discharging mechanism*

Figure 4:
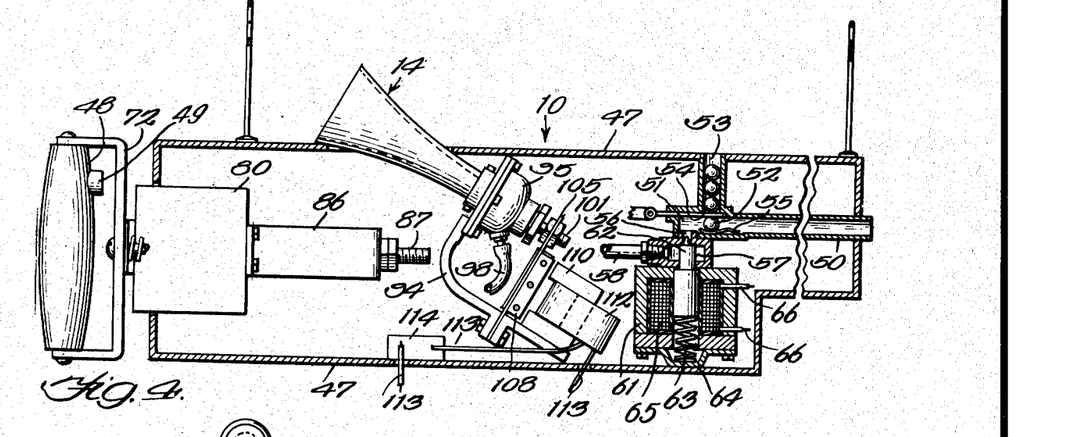
Fig. 4 is a fractional elevational view, partly in section, of a model gun, showing the means for discharging a pellet.

While the mechanism for discharging the pellet from the model gun is not a part of the present invention, a suitable mechanism is shown diagrammatically in Fig. 4. The model gun frame 47 carries handles 48 mounted thereon in a manner which will be described in connection with Fig. 5. A trigger 49 is associated with one or both of the handles 48 and is adapted to operate a trigger switch for energizing the pellet discharging, recoil and gun sound mechanisms. The gun barrel 50 is mounted on frame 47 and contains a receptacle 51 for the pellet 52 at the rearward end thereof, and a magazine 53 from which pellets may be introduced singly into the receptacle 51 by the movement of sliding wall 54. Within receptacle 51 is a bowed leaf spring 55 which holds the pellet yieldingly in position. The wall of the barrel rearwardly of the pellet has an opening or port 56 therein which is in communication with an adjacent air chamber 57 which is connected to air compressor 12 by means of air conduit 58. An electromagnetic core member 61 is arranged adjacent air chamber 57 and carries a valve member 62 which projects into air chamber 57 and normally closes port 56. Valve member 62 is normally held in the closed position by a compression spring member 63 which rests at its opposite end against bracket 64 which is mounted upon the frame 47. Valve member 62 is composed of electromagnetic material and is surrounded by a coil 65, which is connected to a suitable source of electrical energy by means of conductors 66. The arrangement is such that upon the energization of the coil 65 the valve member is drawn back against the compression of spring 63 and opens port 56, admitting air under pressure to the pellet chamber 51 and discharging the pellet 52. Means are provided which are actuated upon pressing trigger 49 for energizing the coil 65 at predetermined times in synchronism with the remainder of the apparatus, as will be described hereinafter. Mechanism (not shown) is provided for withdrawing slide 54 to permit the next pellet to drop into chamber 51 immediately after pellet 52 is discharged.

*Recoil mechanism*

Figure 5:
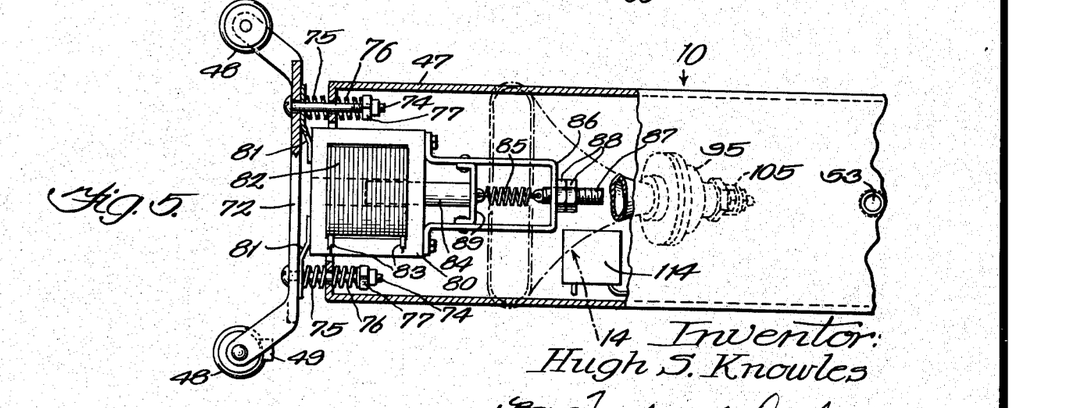
Fig. 5 is a fractional plan view of a similar gun showing a mechanism for producing recoil.

A suitable mechanism for producing recoil in the model gun is illustrated in Fig. 5. This comprises handles 48 which are adapted to be grasped by the trainee, and upon one or both of which may be provided a trigger 49 which is adapted to operate a trigger switch as described heretofore. The handles 48 are mounted upon a recoil plate 72, which is mounted resiliently upon the members of gun frame 47 by means of bolts 74 which pass freely through openings in the frame members and the recoil plate. The recoil plate is arranged at the headed ends of the bolts, and is held in spring-floated relation to the frame by compression coil springs 75 and 76 which telescope over the bolts 74. Springs 75 are arranged rearwardly of the frame members and between the frame members and the recoil plate and springs 76 are arranged forwardly of the frame members and between the frame members and the nuts 77 at the ends of the bolts opposite the headed ends. A solenoid core 80 is resiliently mounted upon recoil plate 72 by means of leaf springs 81 which are fastened at one end thereof to core 80 and at the other end thereof to the coil plate 72. An electrical coil 82 is arranged within the core 80 and is connected to a suitable source of electrical energy by means of conductors 83. A movable armature member 84 is arranged within coil 82 and is normally held in a position partially forward of the coil by a tension spring member 85, which, in turn, is suitably supported by a bracket 86 which is mounted upon the core 80. Spring 85 is connected to a threaded rod member 87 which passes through an opening in bracket 86 and is held in position by means of nuts 88, the positions of which may be adjusted to control the tension on spring 85. Bracket 86 carries a stop member 89 which is adapted to stop the forward travel of the armature.

The arrangement is such that upon energization of the coil 82 the armature 84 is drawn rearwardly and strikes a blow upon the bottom leg of core 80, which blow is transmitted to the recoil plate 72 by springs 81 and thence to the handles 48 and to the hands and arms of the trainee. The force of the blow is made greater and less by decreasing and increasing, respectively, the tension upon spring 85.

*Pneumatic pulse generator*

As explained heretofore, the element of air streaming is produced in the above embodiment primarily by the electropneumatic air pulse generator 14, which is mounted upon the frame structure of gun 10 as shown in Figs. 2, 4 and 5. The unit is shown in detail in Fig. 6 and consists of a horn member 91 which may be composed of metal or other suitable material and is of generally elongated oval shape in transverse section and of considerably greater width than height to present a horizontally elongated mouth. The horn mouth is directed upwardly and rearwardly and projects through an opening in the gun frame, the walls of the horn resting against the frame to hold it in position as shown in Fig. 4. The horn is closed at its throat and has V-shaped ports 92 in its upper and lower walls adjacent the closed end of the throat. The horn is mounted upon a plate member 93 which encircles the throat portion and in turn is fastened to a bracket member 94. A dome-shaped member 95 is mounted at its periphery upon the rearward side of the plate 93 and encloses the throat portion of the horn and forms an air chamber 96 surrounding such throat portion. The wall of dome-shaped member 95 has a threaded opening therein into which the nipple 97 is threaded. Conduit 98, leading from the air compressor 12, is connected to nipple 97 and serves as a supply of air under pressure. An open-sided generally U-shaped, balanced-pressure valve member 99 is arranged in exterior telescoping relation with the upper and lower walls of the valved throat portion of the horn. Valve member 99 has ports 100 therein adapted to cooperate with the ports 92 of the horn. Valve member 99 is preferably composed of a lightweight material, such as a light metal alloy, and the ports 100 are V-shaped, the orientation of the V being the reverse of that of the ports 92 of the horn, whereby when the ports 92 and 100 are in register with each other an extremely rapid flow of air takes place therethrough. The rearward end of valve member 99 is connected to stem 101 and is adapted to be operated thereby. Stem 101 is also preferably composed of a lightweight material and passes through a substantially central opening 102 in dome-shaped member 95. The opening is sealed by a compliant sealing gland 103, which may be composed of rubber, and which is held in place by gland nut 104.

Figure 6:
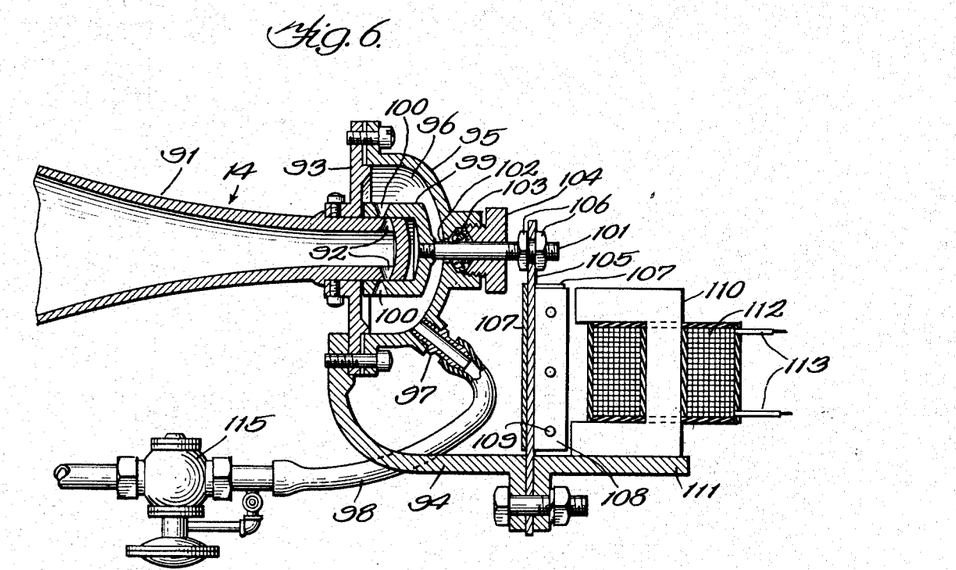
Fig. 6 is a sectional view of an apparatus for producing the air blast or air streaming.

The projecting end of stem 101 is threaded and is connected to a vibrating strip member 105, the two being held together in relatively adjustable relation by threaded nuts 106. An angle member 107 is fastened to strip 105, and armature member 108, which may be composed of a stack of electromagnetic metal laminations, is fastened to angle member 107 by rivets 109. A generally U-shaped core 110, which may also be composed of a stack of electromagnetic metal laminations, is mounted upon a supporting member 111 which is fastened to bracket member 94, the core 110 being arranged with the ends of the U in spaced adjacent relation to the ends of the armature 108. A coil 112 is mounted upon the core 110 and the terminals 113 of the coil are suitably connected to a source of alternating current electrical energy through a make and break contactor device which will be described hereinafter.

In operation, air, which normally is under a pressure of the order of 100 pounds per square inch, is introduced into the air chamber 96 and the coil 112 is momentarily connected to the source of electrical energy by means which will be described hereinafter, which causes an impulse to be imparted to armature 108, such impulse being transmitted by strip 105 and stem 101 to valve member 99. The mass of the moving system, the character of the electrical pulse and the stiffness of strip 105 determine the abruptness with which the valve opens. High stiffness and a steep wave front electrical pulse are desirable for a very abrupt opening. The compliant sealing gland 103 serves as a damping member to damp the free oscillations of the vibrating system. Rearward motion of valve member 99 brings the ports 100 thereof into register with the ports 92 of the horn for a short interval during each operating cycle, and at such interval a slug of air under high pressure is ejected from the mouth of the horn. The valve member 99 is shown in Fig. 6 with the ports out of register. The reciprocating parts move to the right, as viewed in this figure, upon energization of the armature. The increased width of the horn insures that the air blast will be distributed adequately throughout the sphere of action of the trainee. A succession of the electrical impulses is delivered to the coil 112 such that properly timed air pulses of the desired duration are emitted by the horn.

The pneumatic pulse generator may supply the steep initial portion of the wave in Figure 1 as well as the balance of the initial positive pressure pulse. This necessitates a very abrupt opening of the pulse generator valve. To achieve this the current wave of the electrical impulse fed through the coil 112 must have a very steep wave front. To accomplish this, the coil is constructed in such manner that its inductance is low, its resistance is moderately high and a condenser, such as condenser 114 is connected in series with the coil input as shown in Fig. 4 or any other circuit which discriminates against low frequencies, as for example, a high pass filter similar to the network 251, which will be described hereinafter in connection with Fig. 10, may be connected in the coil input. In such an arrangement, the amplitude of the electrical impulse is very high.

In the described pulse generator, streaming occurs when the valve is open which is normally for only a few milliseconds. The exact time depends on the shock wave which is to be reproduced. The air pressure is greater than atmospheric. The V-shaped, or flared ports 92 and 100, permit the rapid flow of air necessary for the blast effect. Acoustic radiation in the ordinary sense is present to but a slight extent. However, if the valve opening is very rapid and abrupt a steep initial wave front is produced which causes the cracking sound mentioned above and causes appreciable amounts of high frequency acoustic energy to be radiated. The streaming effect, nevertheless, greatly predominates.

It is desirable to exceed the pain threshold at least slightly in training. Very little is known of the pain threshold of the human ear because investigators have wished to avoid ear trauma. Most authors have reported that it lies in the vicinity of 600 dynes per square centimeter in the middle audio frequency range. I have found that pressures of not less than 2000 dynes are required for most trainees. From 5000 to 10,000 dynes per square centimeter are necessary for some. The described apparatus is designed to give the mentioned pressures, and means are provided for adjusting the intensity for different trainees comprising the adjustable pressure reducing valve 115 in the air supply conduit 98.

A relatively minor part of the initial shock impulse and a major part of the impulse wave train, together with the echo wave train, is provided by the overhead loud-speaker 23. This speaker is preferably of the moving coil type having a high efficiency and force factor and having a voice coil capable of dissipating appreciable heat. The cone should have a diameter of not less than ten inches and preferably from 15 to 18 inches, whereby it is adapted to contribute to the streaming effect.

Appreciable streaming and augmented acoustic radiation at the fundamental firing rate of the gun are provided by the cabinet 15 itself when the latter is properly designed so as to function as a Helmholtz resonator with pipe 24 serving as the open neck thereof. The cabinet is a complete enclosure except for the pipe 24. The speaker diaphragm opening is closed by the speaker diaphragm. The net internal volume V of the interior of the cabinet 15, the length L of the pipe 24 and the cross sectional area A of the pipe 24 are related in a manner represented by the equation:

$$f = \frac{c}{2\pi}\sqrt{\frac{A}{LV}} \quad (1)$$

where $f$ is the resonant frequency of the enclosure and pipe with the loud-speaker cone held motionless, and $c$ is the velocity of sound in air. Approximate values for $f$ are 10 per second for a 50 caliber machine gun and 20 per second for a 30 caliber machine gun. The diaphragm opening may be covered by a protective screen 22 and the interior end of pipe 24 may be covered by a porous fabric 16 to control the damping of the resonator.

*Wave train generator*

Figure 8:
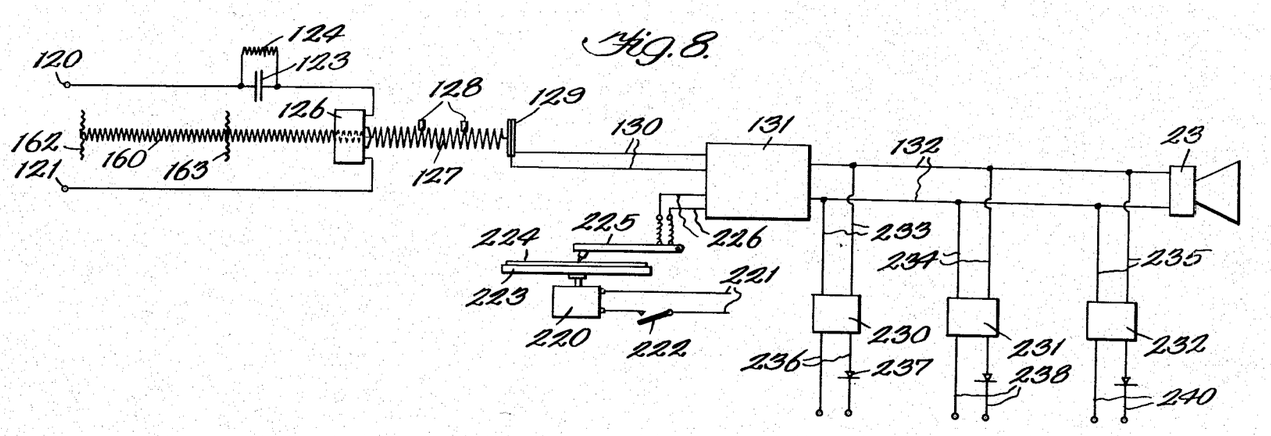
Fig. 8 is a diagrammatic view of means for simulating part of the initial shock impulse, the impulse wave train and echo wave trains, and producing other battle effects.

An electrical system for generating a minor portion of the initial shock impulse and a major portion of the impulse wave and echo wave trains is shown diagrammatically in Fig. 8. This arrangement is contained in cabinet 18 and consists in input conductors 120 and 121 one of which has an electrical make and break mechanism 211 (Fig. 3) connected therein which will be described hereinafter, whereby said conductors are adapted to deliver timed electrical impulses to the circuit associated therewith. Conductor 120 has a condenser 123 connected in series therewith which is shunted by a resistor 124. Conductors 120 and 121 are connected to the input of an electromechanical motor 126 which may be the electromechanical unit of a moving coil loud-speaker and is adapted to convert electrical impulses into mechanical impulses. The output of electromechanical motor 126 is connected to one end of a mechanical transmission line 127 and is adapted to deliver mechanical impulses to said transmission line. The transmission line 127, which will be described in detail in connection with Fig. 9, comprises a resilient coil spring mechanism which sustains each mechanical impulse as a series of vibrations having the natural periodicities, or frequencies, of the transmission line. The transmission line contains one or more damping members 128, which introduce a damping effect whereby the sustained vibrations diminish in energy and cease according to desired characteristics which simulate the characteristics of the impulse wave train shown in Fig. 1.

The output of mechanical transmission line 127 is connected to the input of an electromechanical generator 129, which is illustrated as being a piezoelectric crystal unit and is adapted to convert the mechanical impulses into electrical impulses. The output of electromechanical generator 129 is connected by conductors 130 to one input of a multiple input amplifier 131, the output of which is connected to the input of a loud-speaker 23 by conductors 132. The output of electromechanical motor 126 is also connected to one end of a second resilient spring transmission line 160, which will also be described hereinafter, and which is relatively long with respect to transmission line 127 and extends in the opposite direction from transmission line 127 and is supported at an intermediate portion and at its opposite end by flexible supports 162 and 163.

In operation, an electrical impulse is applied to conductors 120 and 121 as described heretofore and is transmitted to the input of electromechanical motor 126. The steepness of the wave front of the impulse is increased by condenser 123. The electrical impulse is converted by motor 126 into a mechanical impulse, which is delivered to the vibratory transmission line 127, which sustains the impulse as a series of damped vibrations. The train of vibrations, delayed by a small time interval, is delivered to the electromechanical generator 129, which reconverts the mechanical vibrations into electrical vibrations which are transmitted through amplifier 131 to loud-speaker 23. The impulses transmitted directly through line 127 are delivered relatively quickly to the loud-speaker and the resulting acoustical output of the loud-speaker constitutes the impulse wave train similar to that shown in Fig. 1. The mechanical impulse of motor 126 is also delivered to mechanical transmission line 160 and the resulting train of vibrations set up in said transmission line travel from the motor 126 to the opposite end of said transmission line and are there reflected and return to the motor 126 where they are delivered to the short transmission line 127 and are transmitted thereby to electromechanical generator 129 and thence to amplifier 131 and loud-speaker 23. Said second train of impulses arrive at loud-speaker 23 after the impulse wave train heretofore described, and simulate the echo wave trains shown in Fig. 1.

Figure 9:
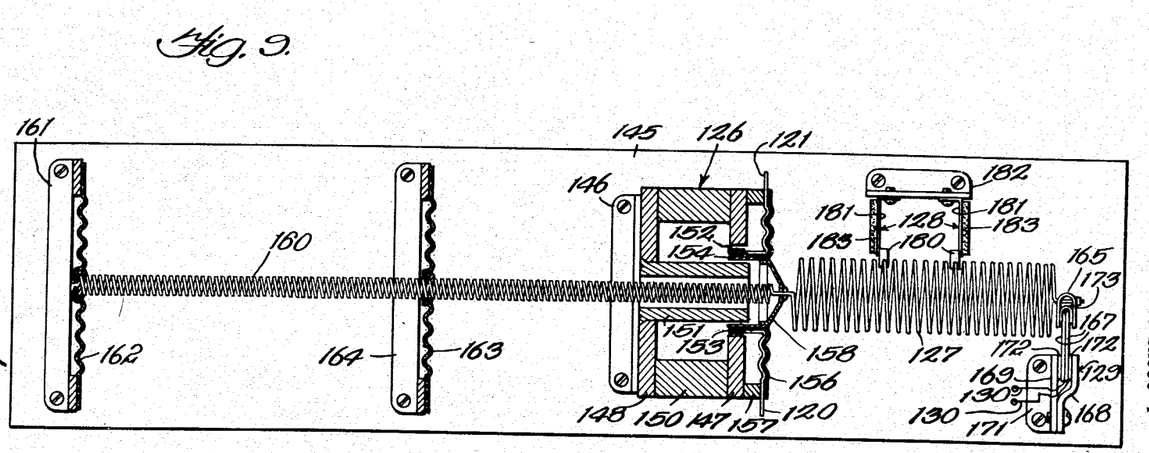
Fig. 9 is a plan view, partly in section, of the mechanical features of a portion of the wave train producing mechanism shown in Fig. 8.

The mechanical features of the means for producing the wave trains, comprising electromechanical transducers 126 and 129 and transmission lines 127 and 160, are shown in Fig. 9. They consist of a supporting base 145 upon which is mounted the motor 126, consisting of a loud-speaker moving coil mechanism which comprises a bracket 146 which is mounted upon the base 145 and carries the two annular end plates 147 and 148 of magnetic material, arranged generally transversely of base 145, the outer hollow cylindrical permanent magnet 150 and the inner hollow cylindrical member 151 of magnetic material, said cylindrical members having their axes extending generally longitudinally of said base. The arrangement is such that an annular air gap 152 is provided surrounding one end of the inner cylindrical member 151 and between said member and annular member 147. Within air gap 152 is located the voice coil 153, which is wound upon cylindrical bobbin 154 of electrically non-conductive material and has terminal conductors 120 and 121 connected thereto, which are the same conductors 120 and 121 as are shown in Fig. 8. One end of the bobbin 154 projects beyond air gap 152 and is attached to a flexible annular membrane 156 which extends outwardly from the bobbin and is supported adjacent its outer periphery upon an annular ring member 157 which, in turn, is mounted upon an edge portion of the annular core member 147. Membrane 156 may contain annular corrugations as shown and may be composed of an air-pervious fabric stiffened sufficiently to maintain its corrugated shape as by being lightly impregnated with a resin in a manner to avoid filling the pores of the fabric. The flexibility of such a fabric in response to the impulses of the moving coil 153 is substantially as great as that of a similar fabric unimpregnated with resin. Conductors 120 and 121 may be cemented to the surface of membrane 156. A conical member 158 of rigid non-magnetic material internally bridges the same end of bobbin 154 and is fastened thereto.

The relatively long coil spring member 160 is attached at one end thereof to said bridging member 158 and extends generally longitudinally of the base 145 and may pass through the hollow interior of the inner cylindrical core member 151 and is attached at the other end thereof to the central opening of a corrugated porous fabric membrane 162, which may be similar to membrane 156 and is supported at its periphery upon bracket 161 which is mounted upon base 145. Spring 160 is preferably in an unstressed condition, that is, under neither tension nor compression. A support for the intermediate portion of spring 160 is provided by a second corrugated membrane 163 which is supported at its periphery upon a bracket 164 which is mounted upon base 145. Spring 160 passes through a central opening in said membrane 163 and is attached to said membrane. Membranes 162 and 163 are preferably readily responsive to the vibratory motion of spring 160.

The coil spring 127, which is preferably maintained in the unstressed condition, is also fastened at one end thereof to bridging member 158 and extends in a direction opposite from spring 160 and is fastened at the other end thereof to the driving member 165 of the electromechanical generator 129 which may be a piezoelectric crystal unit, as described heretofore. The driving member 165 is clamped upon the ends of the two juxtaposed crystal laminae 167, the opposite ends of which are clamped between the arms 168 and 169 of a supporting bracket 171 which is mounted upon base 145. A cushioning member 172 is interposed between the laminae and the arms 168 and 169 and a similar member 173 is inserted between the laminae and driving member 165. The exterior surfaces of the laminae 167 are connected to one of the conductors 130 and the surfaces which are in contact with each other are connected to the other conductor 130 in accordance with accepted practice.

Damping and pulse reflecting members 128 are fastened to spring 127 at points which are spaced apart and spaced from the ends of the spring. Damping members 128 also support the intermediate portions of the spring, and are composed of masses 180 of a material having suitable weight, such as metal, and are mounted upon the ends of arms 181 which are fastened to bracket member 182 which is mounted upon base 145. To further modify the damping effect in the desired manner, members 183, which may be composed of a non-vibratile material, such as leather, cork, rubber, felt or other fibrous construction, or the like, may be attached to the arms 181 as by gluing together the surfaces thereof.

In operation, the momentary electrical impulse applied to the conductors 120 and 121 is conveyed to the moving coil 153. The coil, being in the field of magnet composed of members 147, 148, 150 and 151, undergoes a mechanical impulse in response to the electrical impulse, which impulse is transmitted via bobbin 154 and bridging member 158 to spring 127. A train of vibrations is set up in the spring 127 in response to said impulse, because of the natural vibratile character of the spring, and the initial impulse and wave train are delivered by the spring to the driving member 165 of the electromechanical generator 129. The mechanical wave train is converted into an electrical wave train by generator 129, and is delivered thereby to conductors 130 and is thence conveyed to amplifier 131 and loud-speaker 23. Damping members 128, in addition to damping the vibrations, partially reflect them and by suitably locating the damping members and choosing the characteristics of the spring 127 and the damping members 128, a wave train similar to the impulse wave train illustrated in Fig. 1 is obtained in the loud-speaker output.

The same initial mechanical impulse undergone by the moving coil 153 in response to the electrical impulse is transmitted to the relatively long coil spring 160 and sets up a train of vibrations in the spring 160. Such vibrations travel to the opposite end of the spring and are there reflected and return to the bridging member 158, where they are delivered to the end of spring 127 and are transmitted by said spring to electromechanical generator 129 and are thence conveyed as electrical vibrations to loud-speaker 23. There is a time lag between the delivery of the initial impulse and that of the reflected impulse to spring 127. The construction of spring 160 is such that the sound emitted by loud-speaker 23 in response to said reflected wave train is similar to the echo wave train illustrated in Fig. 1.

A coil spring such as the springs contained in transmission lines 127 and 160 is a compliance member having distributed mass, and exhibits an infinite number of resonant frequencies. The spaced masses 128 act as damping and reflecting members and, in effect, with respect to the low and middle audio frequency range, provide in the transmission line 127 an alternating succession of lumped compliances and masses.

Time-sequence mechanism

Figure 3:
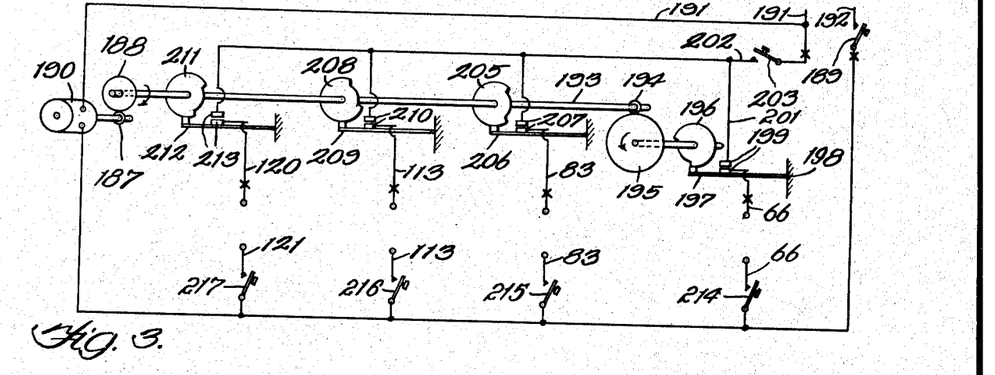
Fig. 3 is a diagrammatic view showing a mechanism for actuating the different effects in timed sequence.

The mechanism for actuating the separate elements for producing the different sequences is shown diagrammatically in Fig. 3. The mechanism is contained in cabinet 18 and consists of a synchronous motor 190 which is connected by conductors 191 and 192 to a suitable source of alternating current energy. A switch 189 for energizing and deenergizing the circuit is located in conductor 192. The motor 190 drives a pair of speed reduction gears 187 and 188 which, in turn, drive shaft 193. Shaft 193 drives a second pair of speed reduction gears 194 and 195. Gear 195 drives a cam member 196, the cam surfaces of which cooperate with cam follower 197. Cam follower 197 is pivotally mounted at its other end upon a stationary support 198 and is urged with spring pressure against the cam surfaces. Cam follower 197 carries one member of a pair of cooperating contacts 199, which contacts are held separated when the raised surfaces of cam 196 engage the cam follower 197 and are in contact with each other when the cam follower engages the depressed surfaces of the cam. One of the contacts 199 is connected by conductor 201 to the conductor 202 which, in turn, is connected to conductor 191 leading to the source of energy, while the other contact is connected to the conductor 66 which leads to the solenoid 65 of the pellet discharging mechanism. The second conductor 66 leading from the pellet discharging mechanism is connected to the second conductor 192 leading to the source of electrical energy. A switch 203, which is adapted to be operated by the trigger 49 shown in Figs. 4 and 5, is inserted in the supply conductor 202.

The gears 194 and 195 are provided to furnish the desired speed ratio between shaft 193 and cam 196, but it is understood that these gears may be omitted if desired and the cam mounted directly upon the shaft 193. In usual practice, a pellet is discharged only a fraction of the number of times that the gun firing operation is simulated since the visible pellets correspond to tracer projectiles.

A second cam 205 is mounted upon shaft 193 and cooperates in a manner similar to that described heretofore with a cam follower 206 to engage and disengage contacts 207 which, in the engaged position, connect conductor 202 leading from the source of power to conductor 83 leading to the recoil producing mechanism shown in Fig. 5. The second conductor 83 leading to the recoil producing mechanism is connected to energizing conductor 192.

Figure 11:
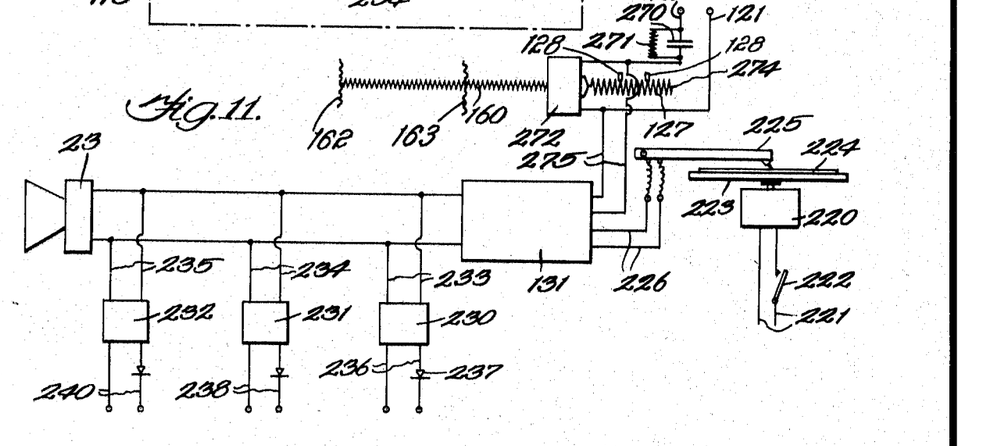
Fig. 11 is a diagrammatic view of an alternative means for producing the impulse wave train, the echo wave trains and additional battle effects.

In a similar manner, cam 208 is also mounted upon shaft 193 and cooperates with a cam follower 209 which engages and disengages contacts 210 which, in the engaged position, connect energizing conductor 202 to conductor 113 leading to the solenoid of the pneumatic pulse generator shown in Fig. 6, and cam 211 is mounted upon shaft 193 and cooperates with cam follower 212 which causes the engagement and disengagement of contacts 213, which, in the engaged position, connect energizing conductor 202 to conductor 120 leading to the input of the loud-speaker system shown in Fig. 11. The second conductors 113 and 121 leading to the pulse generator and the loud-speaker system, respectively, are connected to the second energizing conductor 192. Switches 214, 215, 216 and 217 are arranged in conductors 66, 83, 113 and 121 whereby the different effect-producing mechanisms may be rendered inoperative if desired.

Cams 196, 205, 208 and 211 are arranged to close the respective circuits associated therewith at such times as to actuate the different elements of the apparatus in the desired time sequence. If desired, speed-changing gears, such as gears 194 and 195 may be interposed between shaft 193 and any of the cams to produce any desired ratio of rotation thereof, and the shapes of the cams may, likewise, be modified to produce a number of contacting operations during a single revolution. With the shaft 193 turning in the direction indicated by the arrow in Fig. 3, and the cams arranged as there shown, the elements will be actuated in the following order: first, the pellet discharging mechanism; second, or at substantially the same time, the electromechanical motor; third, the recoil producing mechanism, and fourth, the pulse generator 14. In actual gun fire, the impulse wave train, simulated by loud-speaker 23, follows the air streaming and sharp cracking sound, simulated by the pneumatic pulse generator. In the present apparatus, actuation of the wave train mechanism is advanced with respect to actuation of the initial shock impulse producing means because of the time delay incident to the operation of the wave train mechanism as described heretofore. The order of actuation may be varied as desired. The closure times for the various contactors may be determined by aural observation, and they may also be determined by means of an oscilloscope connected to the high pressure electroacoustic gauge mentioned heretofore.

As stated heretofore, conductors 191 and 192 are connected preferably to a source of alternating current energy. This may be the common 60 cycle 110 volt service supply whereby an ordinary convenience plug and outlet arrangement may be used. The contactors are arranged in such manner that they close each circuit upon the occurrence of a voltage peak and preferably open it upon the occurrence of a current null. The duration of each contact is very short. In a specific application where a 50 caliber machine gun was being simulated the following times were used; approximately 20 milliseconds for the pellet discharging mechanism, 50 milliseconds for the recoil mechanism, and from 4 to 12 milliseconds for the pneumatic pulse generator and the loud-speaker. The use of a synchronous motor, as described heretofore, makes it possible to arrange the closing and opening of the circuits at the desired times in the voltage and current cycles. If desired, however, a direct current energy supply source may be used.

Visual effects

Referring again to Fig. 8, means are there shown for controlling visual effects, such as the approach of the target airplanes 25 and 26 referred to heretofore in synchronism with suitable sound effects. Such means comprises an electric motor 220 which is connected to a suitable source of electric energy by means of conductors 221 and a switch 222 for energizing the motor. The motor 220 operates a turn table 223 carrying a record 224 disposed in cooperative relation with phonograph pick up 225, the output of which is conveyed by conductors 226 to a second input circuit of amplifier 131 and thence to loud-speaker 23. The multiple input amplifier 131 may be constructed according to known practice to provide independently the desired gain and tone qualities with respect to the energy delivered to it from the phonograph pickup 225 and the desired gain and modification of the wave trains received by it from the electromechanical generator 129.

The record 224 carries inscribed thereon battle sounds, such as the sounds of near and distant guns, moving and ricocheting projectiles, human cries, the roar and clatter of mechanized equipment, etc. It also carries a plurality of signals, each of which may be characterized by a different frequency, or band of frequencies, which signals are spaced apart in time sequence. Such signals are picked up by pickup 225 and electric signals of corresponding frequencies are thereby impressed upon conductors 226, amplifier 131 and conductors 132. A plurality of electric wave filters 230, 231 and 232 are connected in parallel relationship with each other to conductors 132 by means of conductors 233, 234 and 235. Each of said wave filters is constructed in accordance with well known practice to transmit electric energy upon receiving in the input thereof energy of a particular frequency, i. e. it is a pass filter with respect to such frequency. For example, filter 230, upon receiving a signal of a particular frequency in the input thereof delivers an electric impulse to the output conductors 236 thereof which impulse is converted into pulsating direct current by means of rectifier 237. Said impulse is conveyed to electromagnetic release 32 by said conductors 236, thereby effecting the release of airplane 25.

In the same way, wave filters 231 and 232 are adapted to deliver electric impulses to conductors 238 and 240 to effect the release of airplane 26 and the operation of tank 37.

Operation

In operation, switches 222 and 189 (see Figs. 3 and 8) are first closed, whereby the movement of record 224 is started and the battle sounds are emitted by loud-speaker 23, and synchronous motor 190 is set in operation. At a suitable time, in synchronism with the sound of an approaching tank, a signal occurs upon record 224, which is picked up by pickup 225 and conveyed to frequency responsive device 232 and thence to relay 43, whereupon tank 37 emerges into the view of the gunner 11. He aims the gun 10 at the tank and presses the trigger 49 which closes the switch 203 in the supply circuit for the various apparatus. Thereupon, upon the closure of the various pairs of contacts shown in Fig. 3, the gun firing phenomena described in detail heretofore take place in the proper time sequence and continue to do so until the pressure upon the trigger is released. At a later instant another signal occurs upon record 224 which releases one of the airplanes as described heretofore. The airplane approaches the gunner and simultaneously the sound of an approaching airplane occurs upon record 224. The gunner aims the gun at the airplane and presses the trigger. In this way the operations continue under conditions closely simulating battle conditions.

Alternative air streaming and wave train apparatus

Figure 10:
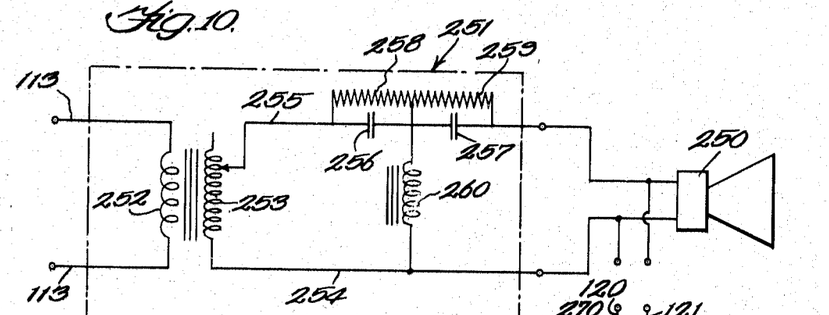
Fig. 10 is a diagrammatic view of an alternative means for producing the initial shock impulse including the air streaming and acoustic crack.

An alternative apparatus for producing the air streaming, the initial sharp cracking noise, the impulse wave train and the echo wave trains is shown diagrammatically in Figs. 10 and 11. The apparatus for producing the initial air streaming and sharp cracking sound or most of the initial shock impulse is shown in Fig. 10. This consists of a shock impulse loud-speaker 250 which takes the place of the pneumatic pulse generator 14 shown in Figs. 4 and 6. The loud-speaker may be of the moving coil type and is connected to input conductors 113 through a network 251, which is so constructed as to modify the character of the incoming electrical impulse so as to increase the steepness of the wave front. The network 251 consists of a transformer having the primary 252 connected to input conductors 113 and an adjustable secondary 253. Output conductors 255 and 254 are connected across the secondary 253 and are connected to the input of the loud-speaker 250. Capacitors 256 and 257 are connected in series with output conductor 255 and resistors 258 and 259 are connected, respectively, in shunt relationship with capacitors 256 and 257. A reactor 260 is connected across conductors 254 and 255 at a point in conductor 255 between capacitors 256 and 257. The adjustable secondary 253 provides a secondary potential of a value to produce the desired intensity of impulse in the loud-speaker 250, and the combination of the two resistors and the two capacitors and reactor 260 comprise a high pass filter having a cut-off frequency above the frequency of the power source and possessing a characteristic impedance approximating the impedance of the loud-speaker 250 at the filter cut-off frequency. The diaphragm assembly of the speaker is so chosen and the resistors are of such a value that there is negligible energy stored in the reactive elements of the mechanical or electrical parts of the system at the time each successive impulse is applied to the network. The values of the capacitors and the reactor are determined by ordinary filter theory in accordance with the impedance of the voice coil of the loudspeaker and the desired cut-off frequency. In a specific instance, the capacitance of each condenser was of the order of 16 microfarads where the voice coil impedance was 6 ohms.

In operation, the electric impulse is conveyed directly from the input conductors through the network to the loud-speaker. Because of the short duration of the impulse, instantaneous electric input energy values up to 3,000 volt amperes may be applied to the voice coil of a speaker having a maximum rating of 40 volt amperes.

The output of the loud-speaker possesses characteristics similar to those of the first positive impulse shown in dotted lines in Fig. 1, which occurs in the first 150 microseconds and makes an appreciable contribution to the remainder of the wave train.

In this embodiment, the remainder of the impulse wave train and the echo wave trains are generated by the apparatus illustrated in Fig. 11. The input conductors 120 and 121 leading from the make and break apparatus (see Fig. 3) and containing condenser 270 and bridging resistance 271 therein, are connected to the input of an electromechanical transducer 272 which may be similar to the electromechanical motor 126 shown in Figs. 8 and 9. Vibratory coil spring transmission lines similar to those shown in Fig. 8 are associated with the electromechanical transducer 272. The corresponding parts in Figs. 8 and 11 are indicated by the same numerals. The vibratory transmission line 127 extends in one direction from the output member of the transducer and is fastened at the opposite end thereof to a support 274, which may be the piezoelectric crystal unit 129, the output leads 130 of which may be disconnected from any load device, whereby the crystal unit serves only as a support for the end of the line 127. The other transmission line 160 extends in the opposite direction from said output member and is supported at spaced locations by membranes 162 and 163. Output conductors 275 are also connected to the conductors 120 and 121 leading to the moving coil of transducer 272, conductors 275 being connected to the first input of the multiple input amplifier 131, which is similar to the multiple input amplifier 131 of Fig. 8 and which has associated with the second input thereof the same phonograph battle sound and signal creating mechanism and with the output thereof the same wave filters and loud-speaker as has been described in connection with Fig. 8, the similar parts being designated by the same numerals.

In operation, an electrical impulse is received by conductors 120 and 121 and conveyed to the electromechanical transducer 272, which is similar to transducer 126 in Figs. 8 and 9 and delivers a corresponding mechanical impulse to the transmission lines 127 and 160. A train of vibrations is set up in line 127 and is transmitted to the end of the line, where it is reflected, some components also being reflected from the damping members 128, the reflected train being delivered to the moving coil 153 and a corresponding train of electrical impulses being set up in said coil, which train is delivered to conductors 120 and 121 and thence to conductors 275 leading to the input of amplifier 131. Said train simulates the impulse wave train shown in Fig. 1. A train of mechanical impulses similarly set up in transmission line 160 is reflected from the end of said line back through the line and to the moving coil 153 (Fig. 9) whereby it is converted into an electrical wave train which is also transmitted to the input of amplifier 131. The latter wave train simulates the echo wave trains shown in Fig. 1. The wave train output of amplifier 131 is conveyed to loud-speaker 23.

Both the initial and echo electrical wavetrains generated by the mechanical vibrations of moving coil 153 (Fig. 9) have an amplitude which is very small compared to the amplitude of the electrical impulse initially conveyed to transducer 272. This arises from the fact that only a fraction of the electrical impulse energy absorbed by moving coil 153 is converted into mechanical energy to provide the mechanical pulse in the transmission lines 127 and 160. Some of the mechanical energy is dissipated in the transmission lines and in the damping and support members which produce the desired multiple reflections of the mechanical pulse. Of the mechanical pulse energy absorbed from the lines by coil 153 only a fraction is reconverted into electrical energy. The gain or amplification of amplifier 131 from terminals 275 is made such that the amplified impulse wave train energy applied to speaker 23 represents half or more of the output capability of the amplifier. When the peak input to the shock impulse speaker 250 is 3,000 volt amperes the peak wave train power delivered by the amplifier 131 to loud speaker 23 need be only of the order of 50 volt amperes, assuming that speakers 23 and 250 have equal efficiencies. This indicates the marked reduction in amplifier power handling capacity obtained by providing the separate heretofore described means of obtaining the initial shock impulse since otherwise the amplifier 131 would have to supply the full 3,000 volt ampere peak power.

Incorporated in the input circuit of amplifier 131 associated with leads 275 there is a gain or volume control and also a voltage limiting stage to limit the amplitude of the initial electrical pulse applied by leads 275 to loud speaker 23. The limiter, which may be any of the well known types used in electronic amplifiers, is so adjusted that the voltage of the initial pulse after being limited is comparable to the voltage of the electrical wave train generated by coil 153.

The battle sounds and signals are generated in phonograph pickup 225 and transmitted to the amplifier 131, wave filters 230, 231 and 232 and loud-speaker 23 in the same manner as described in connection with Fig. 8. The amplifier may contain a gain control to adjust the volume of the loud-speaker sound output.

Figure 12:
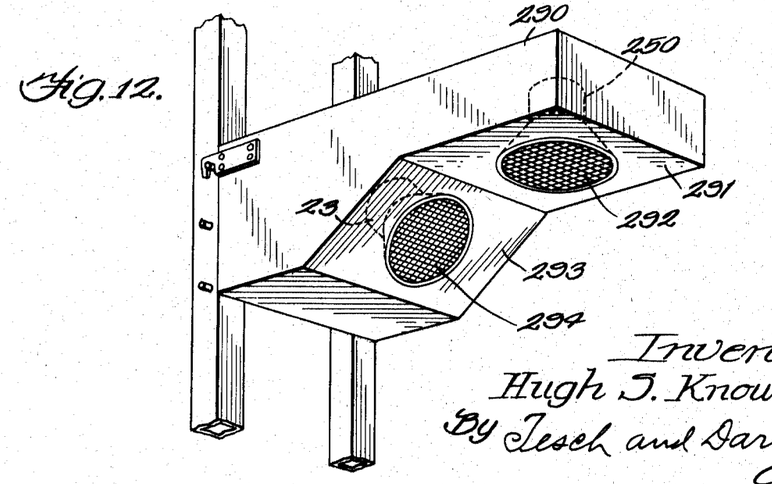
Fig. 12 is a perspective view of an alternative arrangement of loud-speakers and the enclosing cabinet therefor.

In the latter embodiment of the invention, the loud-speakers 23 and 250 are disposed in a cabinet 290, which is shown in Fig. 12, and the remainder of the apparatus is housed in cabinet 18. Cabinet 290 is substantially similar in shape to the cabinet 15 shown in Fig. 7, and is supported in a manner similar to that in which cabinet 15 is supported. The cabinet has a substantially horizontal panel 291 for the bottom of the outer portion thereof, which panel has an opening 292 within which the mouth of speaker 250 is disposed. A diagonally disposed panel 293 encloses the bottom of the midsection of the cabinet, said section having an opening 294 within which the mouth of speaker 23 is disposed, the arrangement being such that the cones of both speakers are directed toward the trainee 11. The cabinet comprises a complete enclosure for the interior thereof, and with proper design of shape and volume, it serves to modify and augment the acoustical and mechanical energy delivered by the loud-speakers in a manner such as to efficiently utilize the electrical input and assist in the faithful simulation of the firing phenomena.

In this embodiment of the invention, the contactors may also be arranged to close each circuit upon the occurrence of a voltage peak, and open it upon the occurrence of a current null. The closure may be upon the occurrence of a negative peak as well as a positive peak since I have found that a rarefaction pulse subjectively resembles a condensation pulse providing the pressure of the condensation does not exceed atmospheric pressure. It is an advantage to use a system in which closure occurs on both peaks, because the reversal of the direction of flow minimizes pitting of the contacts. Such result may be obtained by employing a synchronous motor having four or more poles and which, therefore, has two or more positions in which the rotor locks in with the rotating field. Each time such a motor is started, the polarity thereof may be reversed with respect to its polarity during its previous operation, that is, the polarity is random with each successive operation and reversals occur frequently.

In this embodiment of the invention, the phase relationship of the energy supplied to each of the two loudspeakers 23 and 250 should be such that the integrated energy of their combined acoustic output is a maximum, that is, that the positive impulses of one do not cancel the negative impulses of the other. If the latter should occur, simulation is noticeably impaired, and the effect may be remedied by reversing the conductors leading to one of the loud-speakers.

In this embodiment, the loud speaker 250 must be large and located in close proximity to the trainee, or to the breech of the gun, in order that a satisfactory air streaming effect be obtained. In practice, a loud-speaker having a diaphragm from 10 to 18 inches in diameter and located within a distance equal to 5 times the diameter of the diaphragm from the operator's head or the gun breech has been found to be satisfactory. A position substantially directly over the head of the gunner or the gun breech is also desirable. The need for observing such conditions is made clear by the following considerations. Air streaming is caused by the mass of air adjacent the diaphragm moving with the diaphragm. This mass creates the effect of increasing the mass of the diaphragm. In the case of a flat circular piston vibrating in an infinite rigid wall, this apparent increase in the mass on each side of the piston corresponds to the mass of a cylinder of air having a volume equal to $\frac{8}{3}a^3$ where $a$ is the radius of the piston. Therefore, the mass of air which is moved by the diaphragm, is proportional to the third power of the radius of the diaphragm and a great increase in the streaming effect is obtained by increasing the size of the diaphragm.

At the relatively low frequencies which are involved in the translational air movement present in air streaming the speaker diaphragm behaves substantially as a point source and radiates a wave having a substantially spherical front. In such case, the instantaneous total particle velocity in air is represented by the following equation:

$$u = \frac{A}{2lr} \cos \frac{2\pi}{l} \times (ct-r) + \frac{A}{4\pi r^2} \sin \frac{2\pi}{l}(ct-r)$$

where A is the maximum rate of emission of the air, which is considered to occur at the source or center of the sphere, $l$ is the length of the radiated wave, $r$ is the distance from the center of the sphere to the point of observation, $c$ is the velocity of sound, and $t$ is time, all quantities being expressed in a consistent set of units. The first term of the equation represents the radiated sound field, while the second represents translational particle movement, or the air streaming. The effect of the air flow is, of course, sensible only where there is substantial velocity. The equation shows that the translational velocity decreases at a rate proportional to the square of the distance from the source, and that an object must be in close proximity to the source in order to be reached by the air streaming effect.

While the wave train mechanisms of Fig. 8 and Fig. 11 are shown as having connections to separate make and break contactors they may, if desired, be connected to the contactors 210 which serve the pulse generator 14 when the mechanism of Fig. 8 is used and the pulse loud-speaker 250 when the mechanism of Fig. 11 is used.

The organization shown in Fig. 8 for obtaining the wave trains has been described as being for use with the pneumatic air pulse generator 14 shown in Fig. 6, and the organization shown in Fig. 11 as being for use with the loud-speaker air streaming generator 250 shown in Fig. 10. The arrangement may, however, be reversed and the organization of Fig. 8 may be used with the loud-speaker air streaming generator 250 and the organization of Fig. 11 with the pneumatic pulse generator 14.

While the apparatus of this invention has been described as being applicable for combat training, it may also be used with equipment for other purposes, such as target practice equipment and amusement equipment.

I claim:

1. Apparatus of the class described comprising, in combination, a model gun having non-detonating means for discharging a projectile therefrom and adapted to be operated at will by an operator, a recoil mechanism for said model gun, an air pulse generator arranged to project an air pulse to the position of said operator, separate electromagnetic means for operating each of said projectile discharging means, recoil mechanism and air pulse generator, an electromechanical motor, two coil springs each attached at one end thereof to the output of said electromechanical motor, an electromechanical generator having its input connected to the opposite end of one of said coil springs, the other of said coil springs being attached to one or more flexible supports along the length thereof, said coil springs when at rest being in substantially unstressed condition, a loud-speaker connected to the output of said electromechanical generator, a source of alternating current electrical energy, separate electrical supply circuits for supplying energy from said source to each of said electromagnetic means and to said electromechanical motor, means for repeatedly closing and opening said electrical circuits in synchronism with the energy cycle of said alternating current source and in a predetermined time sequence with respect to each other, means for simulating the sound of a moving target, and means for moving a target in synchronism with said sound.

2. Apparatus of the class described, comprising, in combination, a model gun having non-detonating means for simulating the projectile discharge of an actual gun, a recoil mechanism for said model gun, an air pulse generator, separate electromagnetic means for operating each of said projectile discharge simulating means, recoil mechanism, an air pulse generator, an electromechanical motor, a mechanical transmission line composed of alternating compliances and lumped masses connected at one end thereof to the output of said motor, an electromechanical generator having its input connected to the other end of said transmission line, a loud-speaker connected to the output of said generator, a source of electrical energy, separate electrical supply circuits for supplying energy from said source to each of said electromagnetic means and to said electromechanical motor, means for repeatedly closing and opening said electrical supply circuits in a predetermined time sequence with respect to each other, means for simulating the sound of a moving target, and means for moving a target in synchronism with said sound.

3. Apparatus of the class described, comprising, in combination, a model gun having non-detonating operating mechanism, an air pulse generator, electrical means for operating said air pulse generator, an electromechanical motor, a mechanical transmission line composed of alternating compliances and lumped masses connected at one end thereof to the output of said electromechanical motor, an electromechanical generator having its input connected to the other end of said transmission line, a loud-speaker connected to the output of said generator, a source of electrical energy, separate electrical supply circuits for supplying energy from said source to said air pulse generator and said electromechanical motor, and means for closing and opening said electrical supply circuits in synchronism with said model gun operating mechanism and in a predetermined time sequence with respect to each other.

4. Apparatus of the class described, comprising, in combination, a model gun having non-detonating operating mechanism, an air pulse generator, electrical means for operating said air pulse generator, an electromechanical motor, a mechanical transmission line composed of alternating compliances and lumped masses connected at one end thereof to the output of said electromechanical motor, an electromechanical generator having its input connected to the other end of said transmission line, a loud-speaker connected to the output of said generator, a source of electrical energy, electrical circuit means for supplying energy from said source to said air pulse generator and said electromechanical motor, and means for momentarily energizing said supply circuit means in synchronism with said model gun operating mechanism.

5. Apparatus in accordance with claim 4, in which the air pulse generator comprises means forming an air chamber, means for supplying air under pressure to said chamber, a generally horn-shaped air radiator having a throat portion thereof in communication with said air chamber, and valve means for establishing and disestablishing said communication between said throat portion and said air chamber, said electrical means for operating said air pulse generator being connected in operative relation to said valve means.

6. Apparatus in accordance with claim 4, in which the air pulse generator is a loud-speaker.

7. Apparatus in accordance with claim 4, in which the air pulse generator is a loud-speaker having a diaphragm having a diameter of at least 10 inches, said loud-speaker being located substantially directly above and within a distance equal to 5 times the diameter of said diaphragm from the head of the operator of said gun.

8. Apparatus in accordance with claim 4, in which a single electromechanical transducer constitutes both the electromechanical motor and the electromechanical generator, said transducer having electrical conductors connected thereto leading from the source of electrical energy and leading to the loud-speaker, whereby said conductors serve as both the electrical input and the electrical output of said transducer and said transmission line sets up a train of mechanical vibrations in said transducer in response to each mechanical impulse resulting from the transducing of an electrical impulse impressed upon the input of said transducer.

9. In apparatus of the class described, means for simulating the air streaming, sound and echoes incident to an explosion detonation, comprising, in combination, an air pulse generator, electrical means for actuating said air pulse generator, an electromechanical transducer having electrical terminals and a mechanically vibratory element, two coil springs of different length each attached at one end thereof to the mechanically vibratory element of said transducer, flexible supporting members for the longer of said springs along the length thereof, spaced apart lumped masses attached to the shorter of said springs along the length thereof, said springs, when at rest, being in substantially unstressed condition, a loud-speaker connected to the electrical terminals of said transducer, a source of electric energy, electrical supply circuits leading separately from said energy source to said air pulse generator actuating means and said electrical terminals of said transducer, and means for closing and opening said supply circuits in predetermined time sequence with respect to each other.

10. In apparatus of the class described, means for simulating the air streaming, sound and echoes incident to an explosion detonation comprising, in combination, an air pulse generator, electrical means for actuating said air pulse generator, an electromechanical transducer having electrical terminals and a mechanically vibratory element, two coil-spring members each attached at one end thereof to the mechanically vibratory element of said transducer, flexible supporting members for one of said spring members along the length thereof, lumped masses attached to the second of said spring members at spaced apart points along the length of said second spring member, a loud-speaker connected to the electrical terminals of said transducer, means for momentarily electrically energizing in predetermined time sequence said air pulse generator actuating means and the electrical terminals of said transducer.

11. In apparatus of the class described, means for simulating an explosion detonation sound and the echoes thereof comprising, in combination, an electromechanical transducer having electrical terminals and a mechanically vibratory element, means for momentarily electrically energizing said electrical terminals, a mechanical transmission line comprising alternating compliance members and lumped masses, said transmission line being attached at one end thereof to said mechanically vibratory element, and a loud-speaker electrically connected to said electrical terminals.

12. In apparatus of the class described, means for simulating an explosion detonation sound and the echoes thereof, comprising, in combination, an electromechanical motor, means for momentarily electrically energizing said motor, two mechanical transmission lines comprising compliance members, said transmission lines having different natural frequencies of vibration and each being attached separately at an end thereof to the vibratory element of said electromechanical motor, an electromechanical generator having its input attached to one of said transmission lines at the end thereof remote from said electromechanical motor, and a loud-speaker connected to the output of said electromechanical generator.

13. In apparatus of the class described, means for simulating the air streaming, sound and echoes incident to an explosion detonation, comprising, in combination, a loud-speaker, a high pass filter network connected to the input of said loud-speaker, a source of alternating current electrical energy, an electromechanical transducer having electrical terminals and a mechanically vibratory element, means for momentarily and in predetermined time sequence connecting said energy source to said filter network and the electrical terminals of said electromechanical transducer, a mechanical transmission line comprising a compliance member connected at an end thereof to the mechanically vibratory element of said transducer, and a second loud-speaker connected to the electrical terminals of said transducer.

14. In apparatus of the class described, means for simulating the air streaming, sound and echoes incident to an explosion detonation, comprising, in combination, a loud-speaker, a source of electrical energy, an electromechanical motor, means for momentarily and in predetermined time sequence connecting said energy source to said loud-speaker and said electromechanical motor, a mechanical transmission line comprising a compliance member connected at one end thereof to the output of said electromechanical motor, and a second loud-speaker having its input connected to the other end of said transmission line.

15. In apparatus of the class described, the combination of separate electrical energy responsive means for simulating respectively the different phenomena of air streaming, initial sound and echoes incident to an explosion detonation, an alternating current source of electrical energy, a separate electrical supply circuit reading from said energy source to the means for simulating each of said phenomena, separate means for closing and opening each of said supply circuits, a synchronous motor for actuating said circuit closing and opening means in predetermined time sequence, and a supply circuit leading from said alternating current energy source to said motor.

16. In apparatus of the class described, means for creating an air blast similar to the air streaming incident to an explosion detonation comprising, in combination, a loud speaker, an input circuit for said loud speaker, means for impressing a momentary electrical impulse upon said input circuit, and means in said input circuit for increasing the steepness of the wave front of said electrical impulse.

17. Apparatus of the class described, comprising, in combination, a model gun having a trigger adapted to be moved to the operative position thereof, separate electrical energy responsive means for respectively discharging a projectile from said model gun and simulating each of the phenomena of recoil, air streaming, initial sound and echoes incident to the firing of an actual gun, a source of electrical energy, separate supply circuits leading respectively from said energy source to said projectile discharging means and the means for simulating each cf said phenomena, means for closing and opening said supply circuits in predetermined time sequence with respect to each other, said supply circuit closing and opening means being actuated by movement of said trigger to the operative position thereof.

18. In apparatus of the class described, the combination of a model gun having a trigger adapted to be moved to the operative position thereof, separate electrical energy responsive means for simulating respectively the different phenomena of initial sound and of echoes incident to the firing of an actual gun, a source of electrical energy, separate supply circuits leading respectively from said energy source to different ones of said simulating means, means for closing and opening said supply circuits in predetermined time sequence with respect to each other, said supply circuit closing and opening means being actuated by movement of said trigger to the operative position thereof.

19. In apparatus of the class described, the combination of separate electrical energy responsive means for simulating the different phenomena of initial sound and echoes incident to an explosion detonation, a source of electrical energy, separate electrical supply circuits leading respectively from said energy source to each of said effect simulating means, and means for closing and opening each of said supply circuits in predetermined time sequence with respect to each other.

20. Apparatus of the class described, comprising, in combination, a model gun having a trigger adapted to be moved to the operative position thereof, means for simulating the different phenomena of air streaming, initial sound and echoes incident to the firing of an actual gun and causing said simulations to occur in predetermined time sequence with respect to each other, and means for actuating said simulating means upon movement of said trigger to the operative position thereof.

21. Apparatus of the class described, comprising, in combination, a model gun having a trigger adapted to be moved to the operative position thereof, means for moving a target simulating a sound producing object, means for simulating the sound of said object, non-detonating means for simulating the different phenomena of air streaming, initial sound and echoes incident to the firing of an actual gun and causing said simulations to occur in predetermined time sequence with respect to each other, and means for actuating said last mentioned simulating means upon movement of said trigger to the operative position thereof.

22. In combination, means for simulating the operating mechanism of an actual firearm, said means being adapted to be moved to the operative position thereof, and non-detonating means responsive to said movement to the operative position for producing a shock wave substantially simulating the shock wave produced when an actual firearm is discharged.

23. In combination, a target, means for moving said target, means for simulating the operating mechanism of an actual firearm, said means being adapted to be moved to the operative position thereof, and non-detonating means responsive to said movement to the operative position for producing a shock wave substantially simulating the shock wave produced when an actual firearm is discharged.

24. In combination, means for simulating the operating mechanism of an actual firearm, said means being adapted to be moved to the operative position thereof, and non-detonating means responsive to said movement to the operative position for producing a shock wave and an echo wave train substantially simulating the shock wave and echo wave train produced when an actual firearm is discharged.

25. In combination, means for simulating the operating mechanism of an actual firearm, said means being adapted to be moved to the operative position thereof, and non-detonating means responsive to said movement to the operative position for producing an air streaming substantially simulating the air streaming which is produced when an actual firearm is discharged.

26. In combination, means for simulating the operating mechanism of an actual firearm, said means being adapted to be moved to the operative position thereof, and non-detonating means responsive to said movement to the operative position for producing an impulse wave train and an echo wave train substantially simulating the impulse wave train and echo wave train produced when an actual firearm is discharged.

27. In combination, means for simulating the operating mechanism of an actual firearm, said means being adapted to be moved to the operative position thereof, and non-detonating means responsive to said movement to the operative position for producing an acoustic shock impulse and echo wave train substantially simulating the acoustic shock impulse and echo wave train produced when an actual firearm is discharged.

28. Apparatus of the class described, comprising, in combination, a simulated firearm, a target, said firearm being mounted for movement in alignment with said target, said simulated firearm having means for simulating the operating mechanism of an actual firearm, said means being adapted to be moved to the operative position thereof, and non-detonating means responsive to the movement of said last mentioned means to the operative position thereof for producing a shock wave substantially simulating the shock wave produced when an actual firearm is discharged.

29. Apparatus of the class described, comprising, in combination, a simulated firearm, a target, said firearm being mounted for movement in alignment with said target, said simulated firearm having means for simulating the operation of an actual firearm, said means being adapted to be moved to the operative position thereof, and non-detonating means responsive to the movement of said last mentioned means to the operative position thereof for producing a shock wave and an echo wave train in time sequence substantially simulating the shock wave and echo wave train produced when an actual firearm is discharged.

30. In combination, means for simulating the operating mechanism of an actual firearm, said means being adapted to be moved to the operative position thereof, a source of electrical energy, an electroacoustical transducer, means responsive to the movement of said simulating means to the operative position thereof for supplying a sudden pulse of electrical energy from said source to said transducer, and means for controlling the dissipation of energy in said transducer in such manner that the output thereof substantially simulates the related impulse wave train which normally follows the initial shock impulse produced by the discharge of an actual firearm.

31. In combination, means for simulating the operating mechanism of an actual firearm, said means being adapted to be moved to the operative position thereof, a source of electrical energy, an electroacoustical transducer, means responsive to the movement of said simulating means to the operative position thereof for supplying a sudden pulse of electrical energy from said source to said transducer, and means for receiving pulsating energy from said transducer, storing and returning said energy to said transducer in such manner that the output of said transducer substantially simulates the related impulse wave train which normally follows the initial shock impulse produced by the discharge of an actual firearm.

32. In apparatus of the class described, the combination of a source of electrical energy, an electroacoustical network including a speaker, means for supplying a pulse of electrical energy from said source to said electroacoustical network to simulate acoustical blasting, said network having relatively low energy dissipation characteristics and having a time constant greater than that of said speaker alone to dissipate energy to simulate acoustical booming whereby acoustical blasting and booming is produced by said speaker in time sequence and substantially simulating the acoustical blasting and booming produced when an actual firearm is discharged.

33. In apparatus of the class described, the combination of a source of electrical energy, an electro-acoustical network including a speaker, means for supplying a pulse of electrical energy from said source to said electroacoustical network to simulate acoustical blasting, said network having relatively low energy dissipation characteristics and having a time constant greater than that of the speaker alone to dissipate energy to simulate acoustical booming, means including said network for delaying the application of some of the energy of said pulse to said speaker to simulate echoes of blasting and booming whereby acoustical blasting and booming and echoes thereof are provided by said speaker in time sequence and substantially simulating the acoustical blasting, booming and echoes produced when an actual firearm is discharged.

34. In apparatus of the class described, the combination of an electroacoustical network including a speaker adapted for simulating the acoustical blast attendant upon the discharge of a firearm, a source of electrical energy, means for transferring a pulse of said energy to said network over a relatively short time interval, said network having energy storing means associated therewith and arranged to supply energy to said speaker over a relatively long period of time whereby said speaker radiates acoustical energy for a substantially longer period of time than it receives said pulse of electrical energy from said source.

35. The apparatus as claimed in claim 34 in which said energy transferring means includes a switch and means for closing said switch at predetermined times and for a predetermined time interval at each closure thereof.

36. The apparatus as claimed in claim 34 in which said energy transferring means includes a switch and means for closing said switch periodically and for a predetermined time interval at each closure thereof.

37. In apparatus of the class described, the combination of an electroacoustical network arranged for simulating the acoustical blasting attendant upon the discharge of a firearm, a source of electrical energy, means for transferring a pulse of said energy to said network over a relatively short time interval, said network having energy storing means of relatively large effect and energy dissipating means of relatively small effect whereby said pulse of electrical energy is converted into acoustical energy as a decaying acoustical wave train.

38. In apparatus of the class described, the combination of an electroacoustical network including a speaker adapted for simulating the blasting attendant upon the discharge of a firearm, a source of electrical energy, means for transferring a pulse of said energy to said network over a relatively short time interval, a second network including an interconnected electrical-mechanical system, means for transferring electrical energy from said source to said electrical-mechanical system in predetermined time sequence with respect to said pulse, means for converting mechanical energy in said system to electrical energy, a second speaker, means for amplifying and applying said last mentioned electrical energy to said second speaker, said first and second mentioned speakers being positioned in close proximity for irradiating the same space with acoustical energy.

39. The apparatus as claimed in claim 38 in which the first speaker is arranged to produce air streaming and an acoustical blast.

40. The apparatus as claimed in claim 38 in which the first speaker is arranged to produce air streaming and an acoustical blast, and the second speaker is arranged to transform electrical energy delivered thereto into acoustical energy after termination of said acoustical blast and in continuation thereof.

41. The apparatus as claimed in claim 38 in which the electrical-mechanical system is adapted to produce a time delay of at least one fiftieth of a second between the radiation of a blast by the first speaker and radiation of acoustical energy by the second speaker.

42. In apparatus of the class described, the combination of an electroacoustical network including a speaker adapted for simulating the blasting attendant upon the discharge of a firearm, a source of electrical energy, means for transferring a pulse of said energy to said network over a relatively short time interval, a second network including an interconnected electrical-mechanical system, means for transferring electrical energy from said source to said electrical-mechanical system in predetermined time sequence with respect to said pulse, means for converting mechanical energy in said system to electrical energy, and means for amplifying and converting said last mentioned electrical energy into acoustical energy.

43. In apparatus of the class described, the combination of electroacoustical means for producing an initial aerial shock impulse simulating the initial aerial shock impulse produced when an explosive is detonated, a second electroacoustical means for producing an acoustical impulse wave train simulating the impulse wave train normally following the initial aerial shock impulse produced when an explosion is detonated, and means for synchronizing the operation of said first and second mentioned means to produce the components of the shock wave produced when an actual explosive is detonated.

44. In apparatus of the class described, the combination of electroacoustical means for producing a shock wave simulating that produced when an explosive is detonated, a second electroacoustical means for producing a wave train simulating the echoes of the acoustical components of said actual shock wave, and means for synchronizing the operation of said first and second mentioned means to produce a simulation of the shock wave and echoes produced when an explosive is detonated.

45. In apparatus of the character described, an electromechanical transducer having a mechanical member having energy storing properties, said transducer being arranged to produce movement of said mechanical member when voltage is applied to said transducer, a speaker, a source of electrical energy, common means for supplying energy from said energy source to said speaker and from said transducer to said speaker, said common energy supply means containing a voltage limiter arranged to limit below a predetermined magnitude the voltage applied from said source to said speaker.

46. In apparatus of the character described, an electromechanical transducer including a coil and a magnetic member, said coil being mounted for movement relative to said member for inducing a voltage in said coil upon said relative movement of said coil, means including a voltage source for moving said coil relative to said member, a speaker, means for supplying electrical energy from said coil to said speaker, said supply means containing an amplifier for amplifying the voltage induced in said coil.

47. In apparatus of the character described, in combination, apparatus for simulating a firearm, said apparatus including an operating mechanism adapted to be moved to the operative position thereof, means for producing air streaming, and means responsive to movement of said operating mechanism to the operative position thereof for actuating said air streaming means, said air streaming means being so positioned with respect to said operating mechanism that the stream of air produced thereby flows past the position of said operating mechanism.

48. In apparatus of the class described, the combination of a source of alternating current electrical energy of substantially fixed frequency, an electroacoustical network including a speaker and a high pass filter in the input of said speaker, said filter having a cut-off frequency which is higher than the frequency of said source, means for supplying a pulse of electrical energy from said source to said electroacoustical network to simulate acoustical blasting, said network having relatively low energy dissipation characteristics having a time constant greater than that of said speaker alone to dissipate energy to simulate acoustical booming whereby acoustical blasting and booming is produced by said speaker in time sequence and substantially simulating the acoustical blasting and booming when an actual firearm is discharged.

49. In combination, means for simulating the operating mechanism of an actual firearm, said means being adapted to be moved to the operative position thereof, and electrical means responsive to said movement to the operative position for producing a shock wave substantially simulating the shock wave produced when an actual firearm is discharged.

50. In combination, means for simulating the operating mechanism of an actual firearm, said means being adapted to be moved to the operative position thereof, and electrical means responsive to said movement to the operative position for producing a shock wave and an echo wave train substantially simulating the shock wave and echo wave train produced when an actual firearm is discharged.

51. In combination, means for simulating the operating mechanism of an actual firearm, said means being adapted to be moved to the operative position thereof, and electroacoustical means responsive to said movement to the operative position for producing an initial acoustic impulse substantially simulating the initial acoustic impulse which is produced when an actual firearm is discharged.

52. In combination, means for simulating the operating mechanism of an actual firearm, said means being adapted to be moved to the operative position thereof, an electroacoustical means responsive to said movement to the operative position for producing an initial acoustic impulse and impulse wave train substantially simulating the initial acoustic impulse and impulse wave train which is produced when an actual firearm is discharged.

53. In combination, means for simulating the operating mechanism of an actual firearm, said means being adapted to be moved to the operative position thereof, and electroacoustical means responsive to said movement to the operative position for producing an initial shock impulse substantially simulating the initial shock impulse which is produced when an actual firearm is discharged.

HUGH S. KNOWLES.